(12) United States Patent
Alfstad-Seibel et al.

(10) Patent No.: US 7,393,042 B2
(45) Date of Patent: Jul. 1, 2008

(54) SLIDING FEED DOOR FOR HORSE TRAILER

(76) Inventors: Andrea D. Alfstad-Seibel, 7605 40th Ave. North, Fargo, ND (US) 58102; Scott Arnold Seibel, 7605 40th Ave. North, Fargo, ND (US) 58102

( * ) Notice: Subject to any disclaimer, the term of this patent is extended or adjusted under 35 U.S.C. 154(b) by 0 days.

(21) Appl. No.: 11/592,202

(22) Filed: Nov. 3, 2006

(65) Prior Publication Data
US 2007/0102957 A1 May 10, 2007

Related U.S. Application Data

(60) Provisional application No. 60/735,210, filed on Nov. 10, 2005.

(51) Int. Cl.
*B60J 1/12* (2006.01)
(52) U.S. Cl. .................... 296/146.16; 160/201
(58) Field of Classification Search ............ 296/146.16, 296/24.31, 106, 26.09, 173; 160/201, 209, 160/199; 280/789
See application file for complete search history.

(56) References Cited

U.S. PATENT DOCUMENTS

| | | | |
|---|---|---|---|
| 2,059,833 A * | 11/1936 | Winn, Jr. .................. | 160/201 |
| 3,083,057 A | 3/1963 | Kiser et al. | |
| 3,375,141 A | 3/1968 | Julius | |
| 3,559,716 A | 2/1971 | Loucks | |
| 3,651,969 A | 3/1972 | Bledsoe | |
| 3,685,567 A * | 8/1972 | Pemberton et al. ............. | 160/8 |
| 4,058,239 A | 11/1977 | Van Mill | |
| D251,916 S | 5/1979 | Gendron et al. | |
| 4,530,538 A | 7/1985 | Greene, Jr. et al. | |
| D296,942 S | 7/1988 | Keeter | |
| 5,375,559 A | 12/1994 | Baadsgaard | |
| 5,810,412 A * | 9/1998 | Hall ........................ | 296/24.31 |
| 5,909,717 A | 6/1999 | Randall | |

(Continued)

FOREIGN PATENT DOCUMENTS

GB 585838 2/1947

OTHER PUBLICATIONS http://www.trailers.equiview.com "Horse Trailers for sale, Used Horse Trailers for sale, Cassified Ads" Dixie Horse&Mule Co. Retrieved on Aug. 27, 2005.

(Continued)

*Primary Examiner*—Kiran B. Patel
(74) *Attorney, Agent, or Firm*—Richard C. Litman

(57) ABSTRACT

The sliding feed door for horse trailer is a door panel having lower and upper ends and a window. The feed door has a latching handle to secure the door in open and closed positions. Door hinges are pivotally attached to the upper sides of the feed door. A spring torsion assembly, including a torsion axle, is disposed horizontally along an upper inside trailer wall. Spools having spooled cables are attached to the torsion axle near either end. Free ends of the cables are attached to the feed door hinges. Two guide tracks are spaced apart and vertically disposed within the trailer wall. Two guide wheels are rotatably attached to the feed door hinges and adapted to being vertically slidable in the guide tracks so that spring torsion applied through the cables slides the door into a normally closed position over an opening in the trailer wall.

5 Claims, 5 Drawing Sheets

U.S. PATENT DOCUMENTS

| | | | |
|---|---|---|---|
| 6,024,155 A * | 2/2000 | Sharp | 160/201 |
| 6,055,933 A * | 5/2000 | Lyden | 119/58 |
| 6,127,664 A * | 10/2000 | Eves et al. | 219/722 |
| 6,209,489 B1 | 4/2001 | Akins | |
| 6,250,360 B1 | 6/2001 | Ochoa | |
| 6,401,793 B1 | 6/2002 | Martin | |
| 6,755,155 B2 | 6/2004 | May | |
| 6,931,987 B2 | 8/2005 | Pax et al. | |
| 2007/0028850 A1 * | 2/2007 | Blazek et al. | 119/411 |
| 2007/0040405 A1 * | 2/2007 | Coble et al. | 296/61 |

OTHER PUBLICATIONS http://www.statewidealum.com/livestock.htm "Livestock Trailer Components", State Wide Aluminum Retrieved on Aug. 27, 2005.

* cited by examiner

SLIDING FEED DOOR FOR HORSE TRAILER

CROSS-REFERENCE TO RELATED APPLICATION

This application claims the benefit of U.S. Provisional Patent Application Ser. No. 60/735,210, filed Nov. 10, 2005.

BACKGROUND OF THE INVENTION

1. Field of the Invention

The present invention relates to horse trailers, and particularly to a sliding feed door for a horse trailer.

2. Description of the Related Art

It is often necessary to transport horses by automobile. A great many horse trailers have been developed for this purpose, some very simple, others offering more options for the convenience and comfort of both the horse and the owner. While some trailers are only equipped with feed bags, others are equipped with feed bins or mangers that are accessible by feed doors mounted on the side of the trailer. Such feed doors are usually hinged, and may either drop down or open to the sides. Usually the doors are mounted high on the sides of the vehicle, as it may be uncomfortable for the horse to bend or crane the neck when feeding, and to make maximum available use of trailer space.

While this architecture is effective, nevertheless, the position of the feed door and the pivotal attachment of the feed door are inconvenient for children and vertically challenged adults. Quite often shorter individuals either cannot reach the door handle and latches without standing on a stool or other support, or the short person bangs his or her head when swinging open a drop down feed door. Although a great many types of doors have been provided for other types of trailers and mobile homes, none are satisfactory enough to provide an effective solution for permitting short people easy-access and easily opened feed doors for a horse trailer.

Thus a sliding feed door for horse trailer solving the aforementioned problems is desired.

SUMMARY OF THE INVENTION

The sliding feed door for a horse trailer is a door panel having lower and upper ends and a window. The feed door has a latching handle to secure the door in open and closed positions. Door hinges are pivotally attached to the upper sides of the feed door.

A spring torsion assembly, including a torsion axle, is disposed horizontally along an upper inside trailer wall. Spools having spooled cables are attached to the torsion axle near either end. The free ends of the cables are attached to the feed door hinges.

Two guide tracks are spaced apart and vertically disposed within the trailer wall. Two guide wheels are rotatably attached to the feed door hinges and adapted to being slidably attached to the guide tracks so that spring torsion applied through the cables slides the door into a normally closed position over an opening in the trailer wall.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
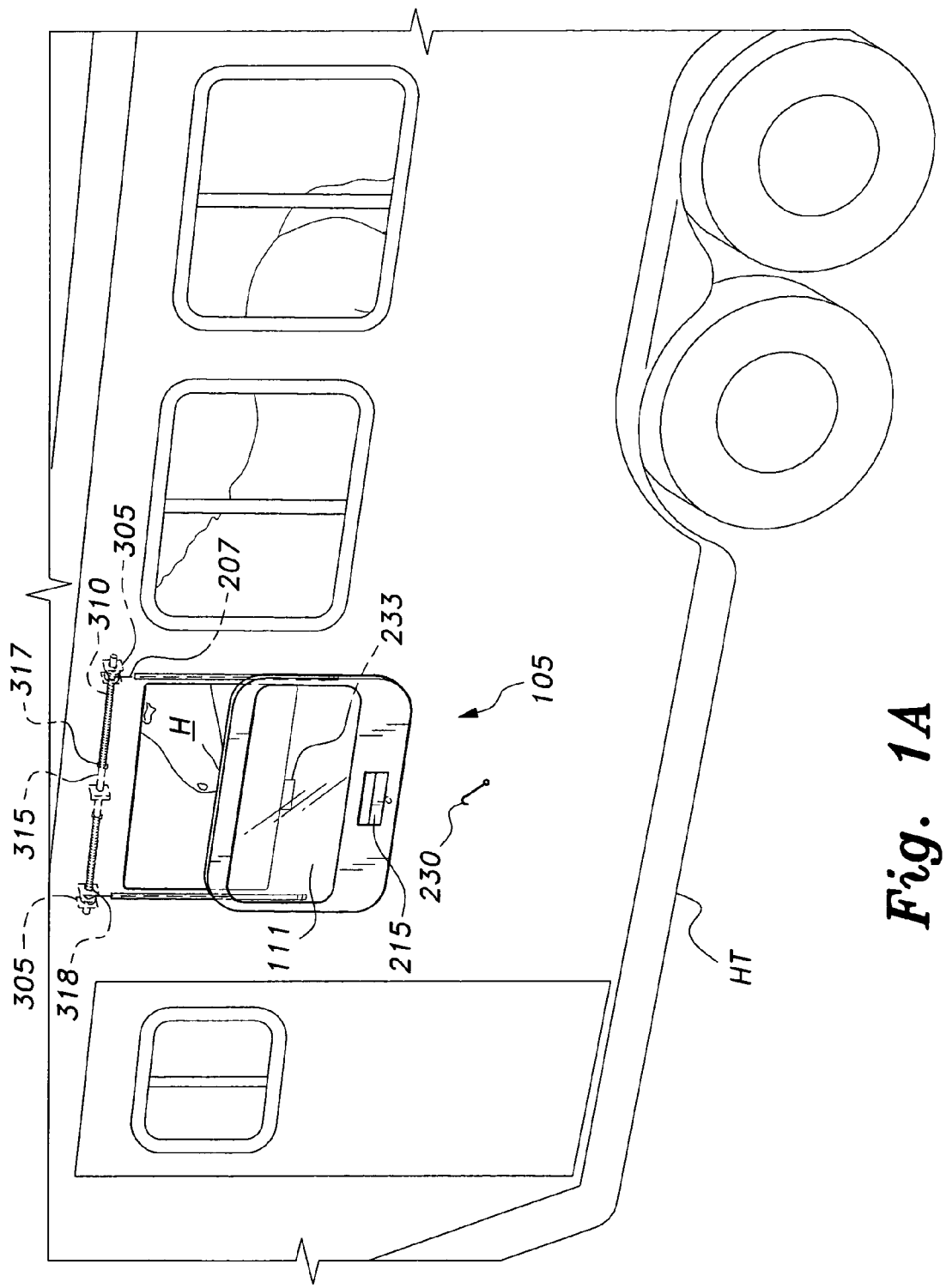
FIG. 1A is an environmental, perspective view of a sliding feed door for horse trailer according to the present invention.
Figure 1B:
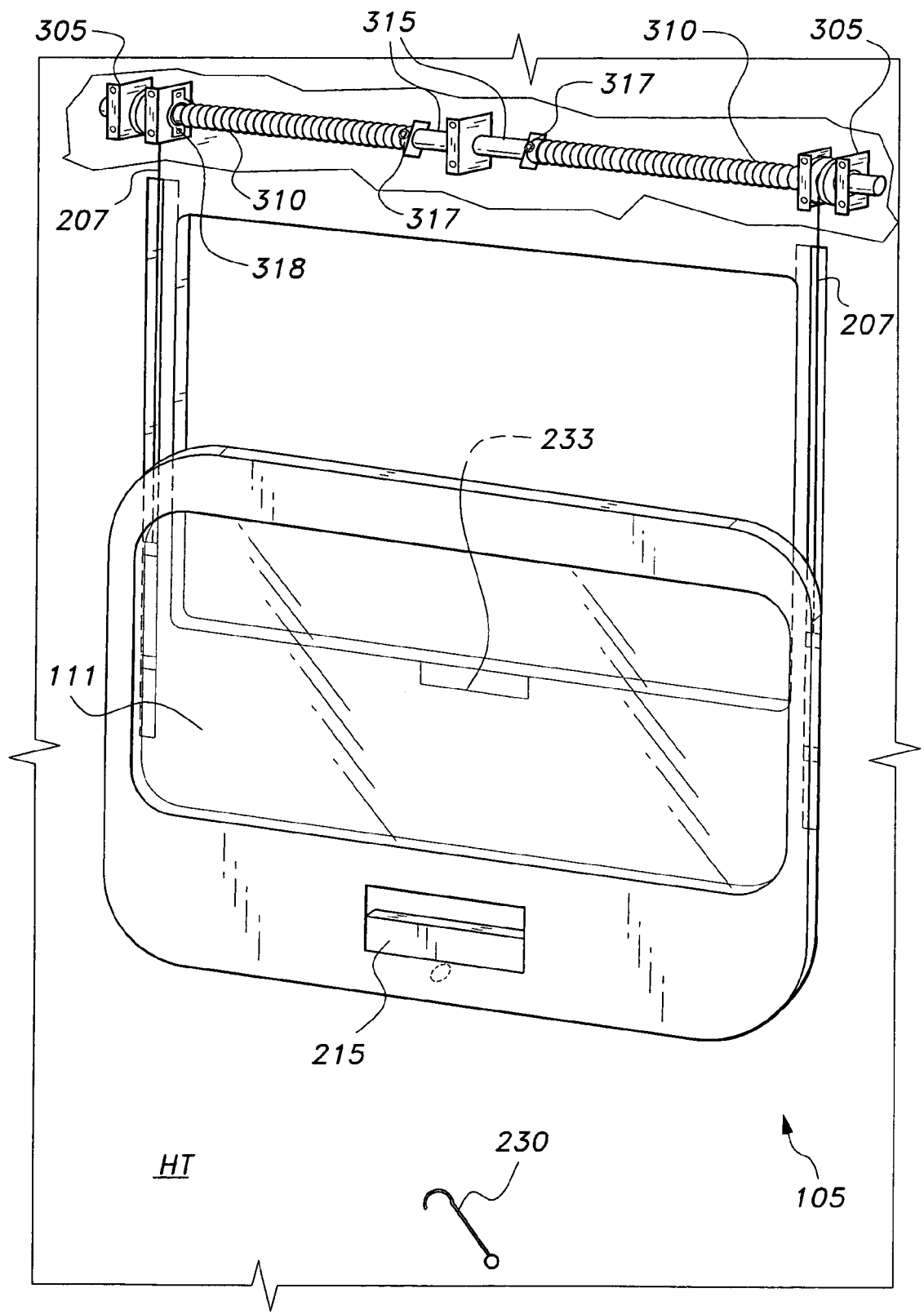
FIG. 1B is a detail perspective view of the sliding feed door of FIG. 1A, with the trailer broken away to show details of the mechanism.
Figure 2:
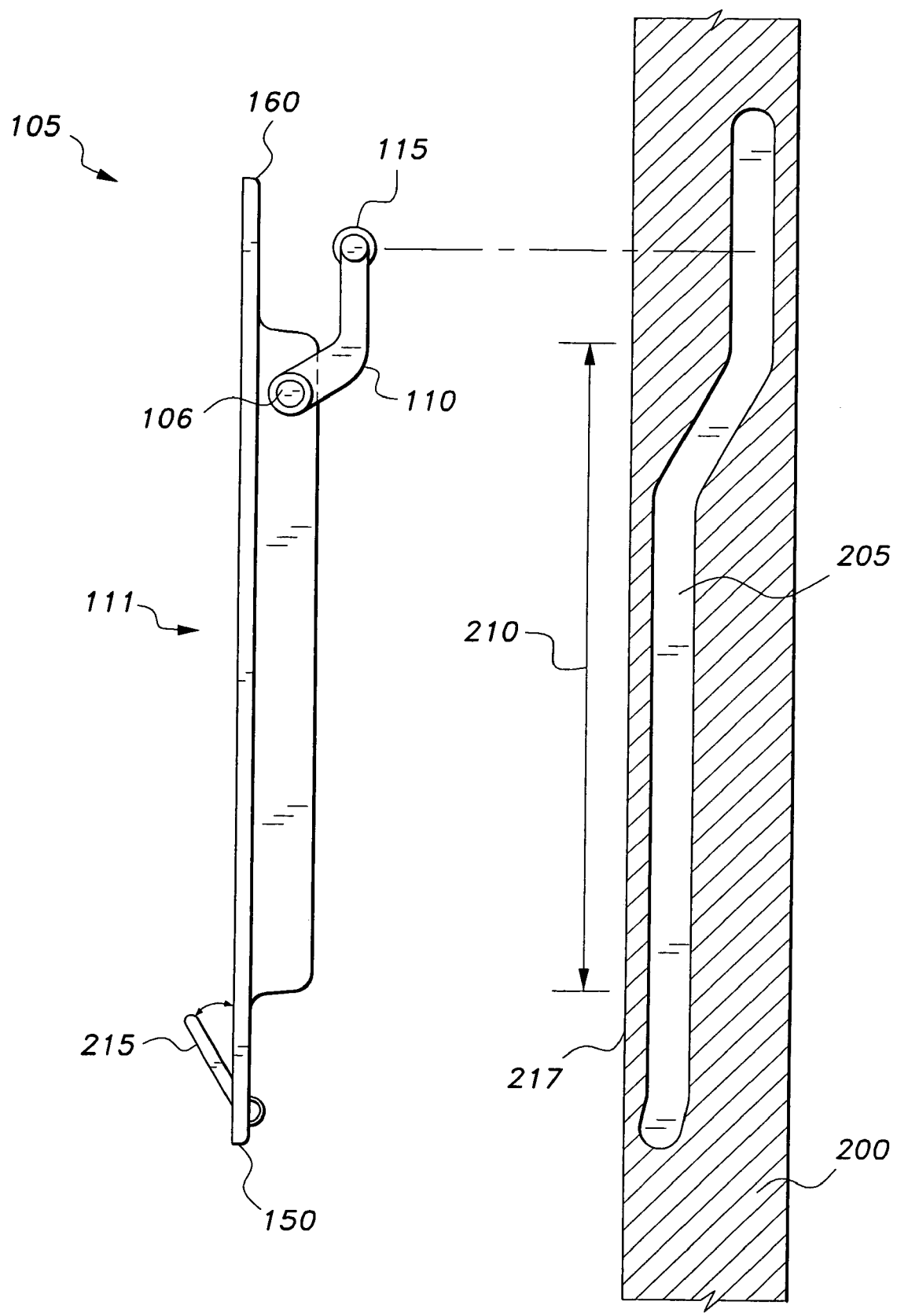
FIG. 2 is a partially exploded side view of the sliding feed door according to the present invention, partially in section.

As shown in FIGS. 1A, 1B and 2, the present invention is a door panel 105 having a lower end 150, an upper end 160, and a window 111 framed within the door panel 105. The lower end 150 of feed door 105 has a latching handle 215 to secure the door 105 in an open position by engaging with a latch keeper 230 after the door 105 has been slid down by a user, and to secure the door 105 in a closed position by engaging with a closed position keeper 233.

Figure 3:
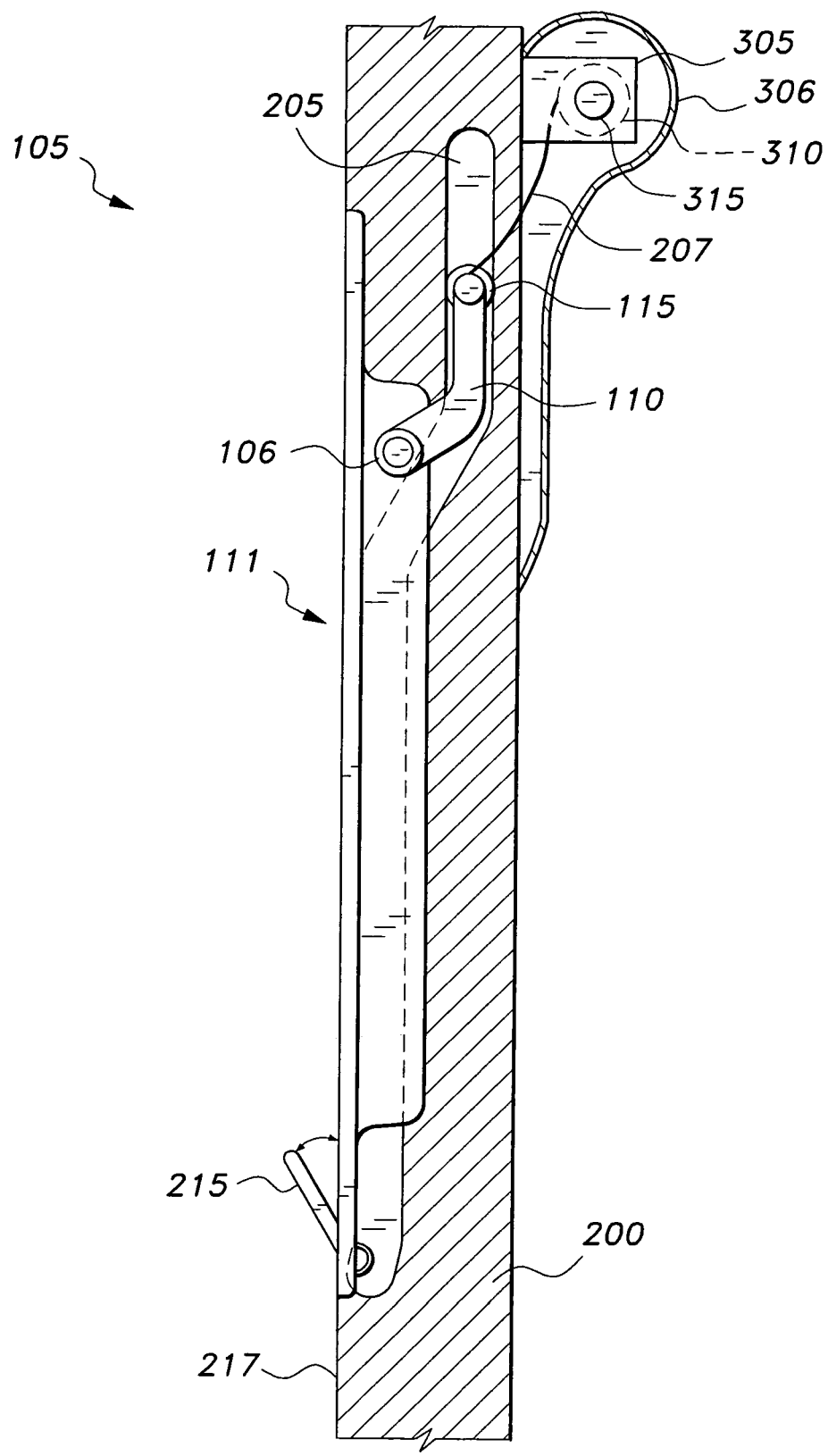
FIG. 3 is a side view of the sliding feed door according to the present invention, partially in section.

As shown in FIG. 2, door hinges 110 having an off-centered, boomerang shape are pivotally attached to upper sides near the upper end 160 of the feed door 105 at pivot hinge connection 106. As shown in FIGS. 1B and 3, a spring torsion axle 315 is disposed horizontally along the upper inside of trailer wall 200 and held in place by mounting brackets 305, the torsion axle 315 having at least one, and preferably a pair of, helical torsion spring(s) 310 concentrically disposed thereon.

As shown in FIGS. 1B and 3, spools having spooled cables 207 are attached to the torsion axle 315 near either end. Free ends of the cables 207 are attached to the feed door hinges 110. A protective shroud 306 attaches to the inside of horse trailer wall 200 to cover the springs 310, the torsion axle 315, spooled cables 207 and mounting brackets 305. An upward torsional force is generated by pulling on free ends of cables 207, which, in turn, causes the torsion axle 315 to rotate distal ends 317 of the helical torsion springs 310 while ends 318 proximal to mounting brackets 305 are held stationary. Thus, springs 310 are loaded when door panel 105 is pulled downward, and the spring coils return to their normal relaxed state when the door panel 105 is released, thereby biasing door panel 105 upward to a closed position flush in the trailer wall.

As most clearly shown in FIG. 2, two guide tracks 205 are spaced apart and vertically disposed in guide track casement 217 within the trailer wall 200.

Preferably each of the guide tracks 205 has a dogleg shaped lateral change in guide direction near an upper portion of the track casement 217 to facilitate guiding the feed door 105 into a closed position that snugly fits against the outside of wall 200 of the horse trailer HT.

As shown in FIGS. 1B, 2 and 3, two guide wheels 115 are rotatably attached to the feed door hinges 110 and adapted to being vertically and slidably attached to the guide tracks 205 so that the spring torsion applied through the cables 207 slides the door 105 into a normally closed position covering an opening 210 in the trailer wall 200 below which the door 105 may be securely latched by engaging handle and latch 215 with closed position keeper 233.

Figure 4:
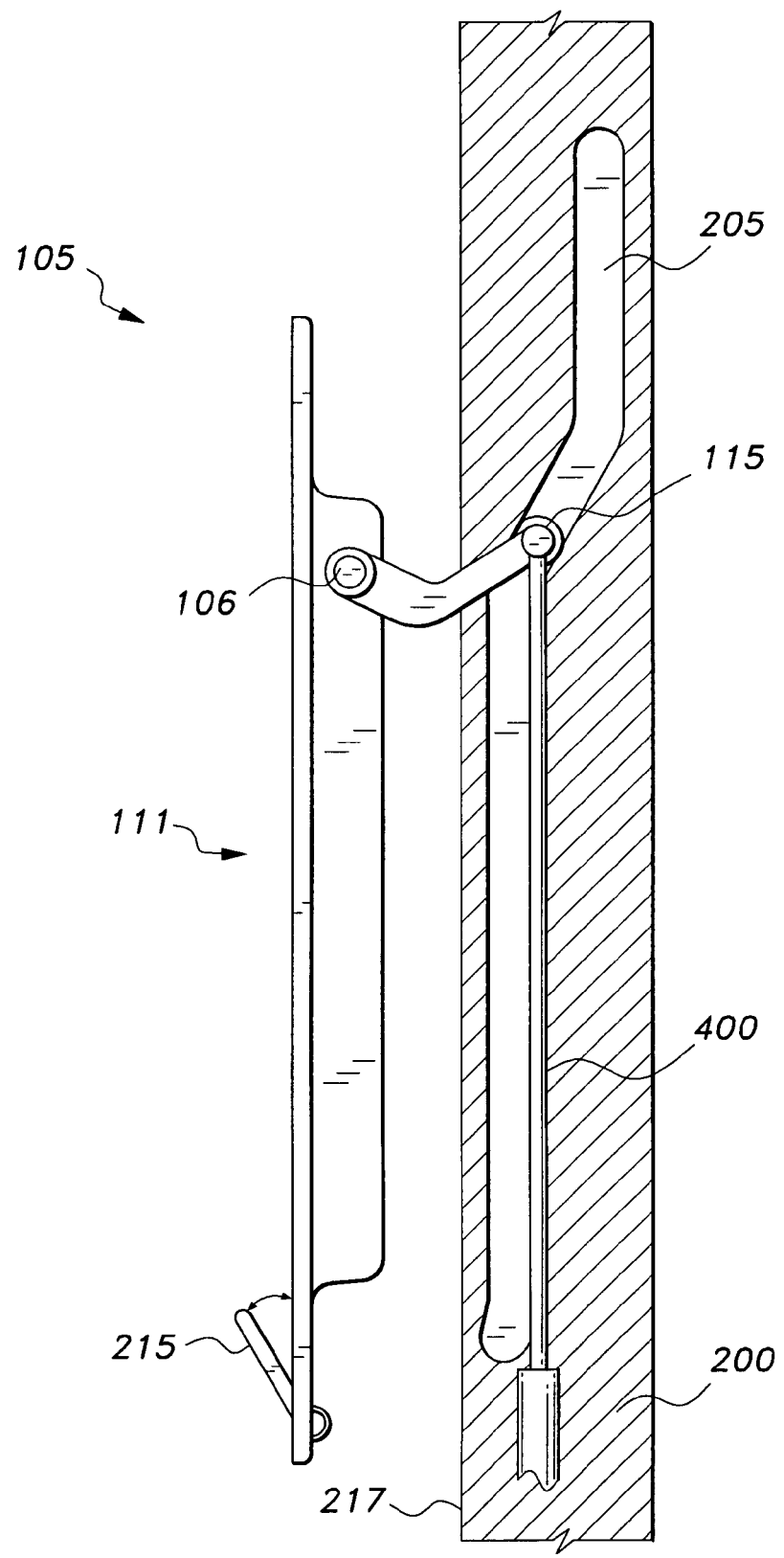
FIG. 4 is a side view of an alternative embodiment of the sliding feed door according to the present invention, partially in section.

As shown in FIG. 4, a gas shock assembly 400 may be pivotally attached to the door hinges 110 and to the trailer wall 200 to provide an upward force on the door 105 as an alternative to the spring torsion assembly 315 with cables 207.

It is to be understood that the present invention is not limited to the embodiment described above, but encompasses any and all embodiments within the scope of the following claims.

We claim:

1. A sliding feed door for a horse trailer, comprising:
a substantially rectangular door panel having a lower end, an upper end, and opposing sides;
a handle and latch assembly attached to the lower end of the door panel;
two feed door hinges, the hinges being pivotally attached to the opposing sides of the door panel, respectively, at the upper end of the panel;
a torsion axle and at least one spring disposed on the axle, the axle being adapted for mounting to a trailer wall above the door panel;
two spools, each of the spools having a spooled cable, the spools being attached to the axle near either end of the axle, respectively, each of the cables having a free end attached to a corresponding one of the feed door hinges;
two guide tracks adapted for being mounted vertically to opposite sides of a feed door opening in the trailer wall;
a latch keeper adapted for mounting in a position centered below the feed door opening, the latch keeper releasably engaging the handle and latch assembly to maintain the door panel in an open position; and
two guide wheels, each of the guide wheels being rotatably attached to a respective one of the feed door hinges, the guide wheels slidably engaging the guide tracks;
wherein the at least one spring biases the cables to pull the door panel up to cover the feed door opening in a closed position, the door panel being slidable downward and latchable against the spring bias in an open position below the feed door opening.

2. The sliding feed door according to claim 1, wherein said hinges have on off-centered boomerang shape.

3. The sliding feed door according to claim 1, further comprising mounting brackets adapted for attachment to the trailer wall, said torsion axle being rotatably mounted in the brackets.

4. The sliding feed door according to claim 1, further comprising a protective shroud removably disposed over the at least one spring, and the torsion axle, the spooled cables.

5. The sliding feed door according to claim 1, wherein each of the guide tracks has a dogleg shaped lateral change in guide direction near an upper portion of the guide tracks adapted for guiding said door panel flush into the trailer wall in the closed position.

* * * * *